June 22, 1965   J. L. MILANOS ETAL   3,190,425
COIN OPERATED LATCH DEVICE
Filed Aug. 12, 1963   4 Sheets-Sheet 1

Inventors
JERRY L MILANOS
ANGELO MILANOS
By Robert F. Ruemeli
Attys

June 22, 1965     J. L. MILANOS ETAL     3,190,425
COIN OPERATED LATCH DEVICE

Filed Aug. 12, 1963     4 Sheets-Sheet 2

Inventors
JERRY L MILANOS
ANGELO MILANOS
BY Robert F. [signature]
Attys

June 22, 1965  J. L. MILANOS ETAL  3,190,425
COIN OPERATED LATCH DEVICE
Filed Aug. 12, 1963  4 Sheets-Sheet 4

Inventors
JERRY L MILANOS
ANGELO MILANOS
By Robert F. Ruemel
Attys

United States Patent Office 3,190,425
Patented June 22, 1965

3,190,425
COIN OPERATED LATCH DEVICE
Jerry L. Milanos and Angelo Milanos, both of
203 W. Water St., Hillsboro, Ill.
Filed Aug. 12, 1963, Ser. No. 301,482
14 Claims. (Cl. 194—1)

This invention relates to a latch device and, more particularly, to a coin operated latch device particularly suited for use with a dispenser for live fishing bait as disclosed in our copending patent application, Serial No. 47,859, filed August 5, 1960, now United States Letters Patent No. 3,105,320 of which this application is a continuation-in-part.

Previously proposed devices for dispensing live aquatic animals, and particularly fishing bait, have generally been impractical in that they are too large for the quantity of bait which they can hold, and are too complicated in design resulting in an unduly high initial cost and often a prohibitive maintenance cost. In addition, most prior devices do not permit a selection of different units of bait and, therefore, a fisherman cannot select the size and type of bait which he desires.

These difficulties and limitations have been effectively overcome by the dispenser disclosed in the previously mentioned patent application, wherein a coin operated latch device releasably holds an empty one of a plurality of bait holding baskets in a cage structure surmounted on a cover movably mounted over an open top end of a water tank which contains the other bait holding baskets. The baskets are secured to the tank and the latch device releasably retains the empty basket in the cage so that the cover cannot be moved. Upon inserting a coin to release the latch device, the empty basket drops out of the cage and back into the tank, whereupon the cover can be freely rotated to a position over any selected full basket of bait which may then be moved into the cage for dispensing the bait, and when emptied this basket is retained in the cage as previously described.

It is, therefore, the primary object of this invention to provide a new and useful latch device. A related object is provision of such a latch device which is particularly suited for use with a dispenser as described in the aforementioned patent application.

Another object is provision of a new and useful latch device having a latched position for releasably holding a member in a latched position and operable to release the member, the latch device being automatically moved to its latched position upon movement of another member into its latched position. A related object is provision of such a latch device which is operable upon insertion of a coin. Still another related object is provision in such a latch device of a coin return mechanism.

A further object is provision of a new and useful coin return mechanism for a coin operated latch device.

These and other objects of the invention are more particularly set forth in the following description and the accompanying drawings of which.

Figure 1:
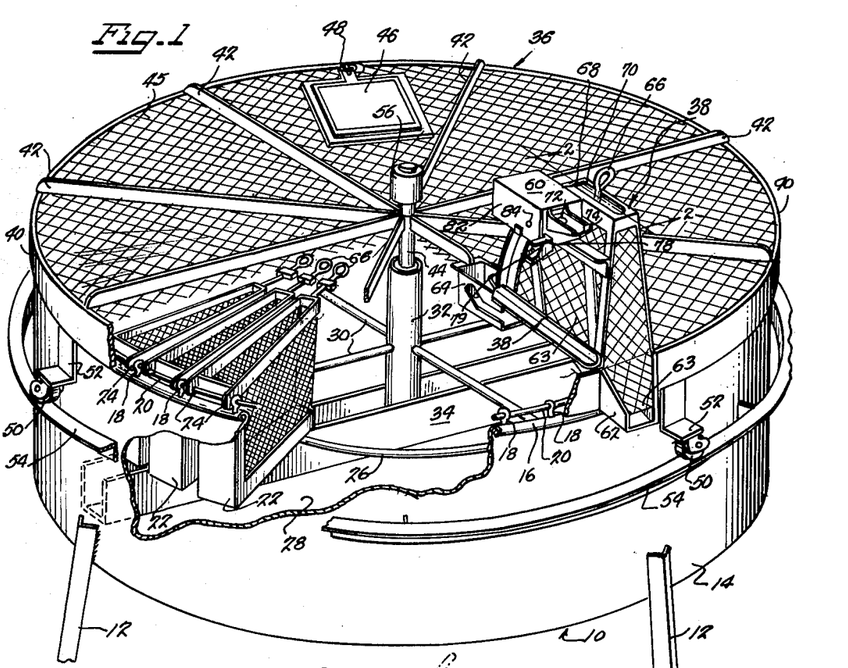
FIGURE 1 is a fragmentary perspective view illustrating a preferred embodiment of a latch device of this invention in a normal latched position and illustrated in conjunction with a fishing bait dispenser, with parts broken away and removed for clearer illustration.

The live bait dispenser will be briefly described herein, and reference may be had to the aforementioned patent application for a complete description. With reference to FIGURE 1, a live fishing bait dispenser herein includes a generally cylindrical tank 10 mounted on depending supporting legs 12 welded, or otherwise suitably firmly secured, to a lower portion of a cylindrical side wall 14 of the tank. The tank has an open upper end which is herein defined by a rolled peripheral edge 16 to which are secured a plurality of upwardly extending eyes, as 18. An annular rod 20 extends through the eyes 18 and overlies the rolled edge 16. A plurality of bait holding containers or baskets, as 22, are normally radially disposed within the tank 14. Each basket has a pair of extensions, as 24, extending radially outwardly from the top of the sides of each basket, the extensions of each basket being received between adjacent eyes 18 to retain the respective basket in proper radial position within the tank. Each extension has a hole receiving the annular rod 20 for pivotally mounting the basket within the tank. More particularly, when the baskets are fully received within the tank 14 their bottoms rest on an annular rail 26 near a bottom wall 28 of the tank and rigidly secured within the tank as by spokes 30 which may have outer ends firmly secured to the cylindrical side wall 14, as by welding. The spokes 30 extend inwardly from the rail 26 and are secured to a center post 32 which is rigidly secured to and extends upwardly from an upwardly opening channel member 34 diametrically positioned with the tank 14 and spaced above the tank bottom wall 28 with its opposite ends firmly secured to the cylindrical side wall 14, as by welding. Thus, the baskets 22 are mounted to be swung upwardly from their position within the tank 14 to a dispensing position which will be more fully described hereinafter.

A cover 36 is mounted for rotation above the open top end of the tank 14 to position a basket receiving cage 38 above any desired one of the baskets 22 within the tank 14 so that the basket may be moved to its dispensing position within the cage. The cover 36 may be of any suitable type and herein includes an annular rim 40 which is secured as by a plurality of radially extending spokes 42, to a depending center post 44 which is journaled within the tube 32 so that the cover 36 may rotate freely in a horizontal plane. Herein suitable wire mesh 45 is secured to the spokes and rim to effectively prevent a person from reaching into the tank 14. In order to service the dispenser as in filling the baskets 22 with live fish, an upwardly swinging hinged door 46 forms part of the cover and may be retained in closed position in any suitable manner as by a hasp and padlock 48, as shown in FIGURE 1. In order to steady the cover 36, a plurality of circumferentially spaced rollers, as 50, may be secured by suitable brackets 52 to the outer face of the annular rim 40 so that the rollers ride on an annular track 54 rigidly secured to and extending outwardly from the outer surface of the tank cylindrical side wall 14.

An aerator 56, of any suitable type, may be provided for aerating the water within the tank 14 as is well understood in the art, and herein the aerator is associated with the center post 44 of the cover 36.

In order to hold the cover 36 against free rotation, an empty basket 26 is releasably retained within the cage 38 by means of a latch device 60 (FIGURES 3–8). The cage is of such shape as to permit a basket 22 to pass freely therethrough from its position within the tank 14 to its dispensing position wherein the bait within the tank are poured through a spout 62 in the annular rim 40 of the cover at the outer end of the cage 38. The cage is covered by a suitable wire mesh, as 63, to prevent a person from reaching a hand through the cage and into the baskets within the tank 14.

Herein the latch device 60 is coin operated to release a basket 22 retained within the cage 38 and upon such release, the basket drops back into the tank 14 whereupon the cover 36 may be rotated over a basket 22 which is full of bait. The full basket 22 may then be grasped by the buyer reaching his hand through a generally U-shaped opening formed by a frame 64 in the cover rearwardly of the cage 38 and grasping an arm member 66 which is integral with and extends rearwardly from the selected basket 22. The arm is then lifted upwardly along a path, and more particularly, through a slot 68 in a top and rear wall 70 of the cage 38, until the arm member 66 rests against the wall at the front end of the slot 68 (FIGURE 2) so that the bait will slide through the spout 62. As the basket arm 66 moves upwardly through the slot 70 it automatically actuates the latch device 60 from a released position to a latched, cocked position so that when the basket arm 66 is released, it will fall, by gravity, rearwardly to the position shown by solid lines in FIGURES 1 and 2, and as previously described is retained in this normal position by the latch device 60. The latch device 60 is operated by depositing a suitable coin within a coin receiving hole 72 in an actuating slide 74 (of any suitable commercially available coin slide actuator) which may then be pushed inwardly to deposit the coin within a housing 76 of the latch device 60. Such movement of the slide 74 actuates the latch device to release the empty basket 22 within the cage 38 and the basket falls into the tank. A coin return grip 78 may then be operated by the buyer to return a coin into a chute 79 whereupon the latch device is automatically moved back to its cocked position, in which position a basket 22 cannot be moved to its dispensing position within the cage 38, as will be more fully described hereinafter.

Figure 2:
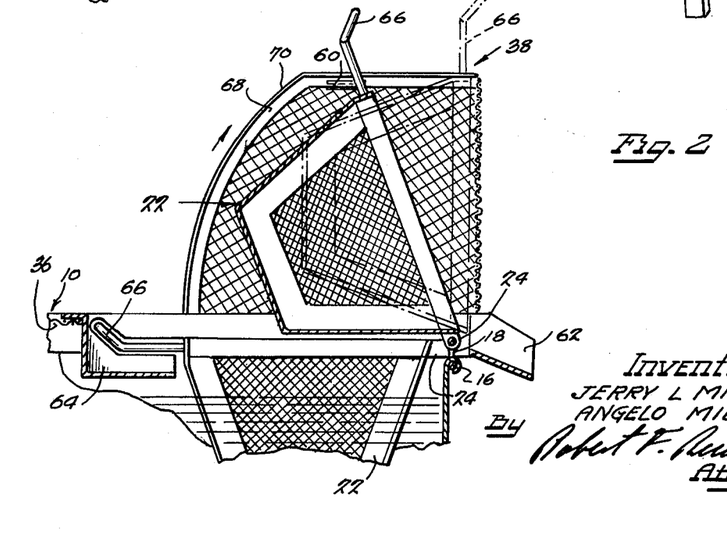
FIGURE 2 is a fragmentary, enlarged vertical sectional view taken generally along the line 2—2 in FIGURE 1.
Figure 3:
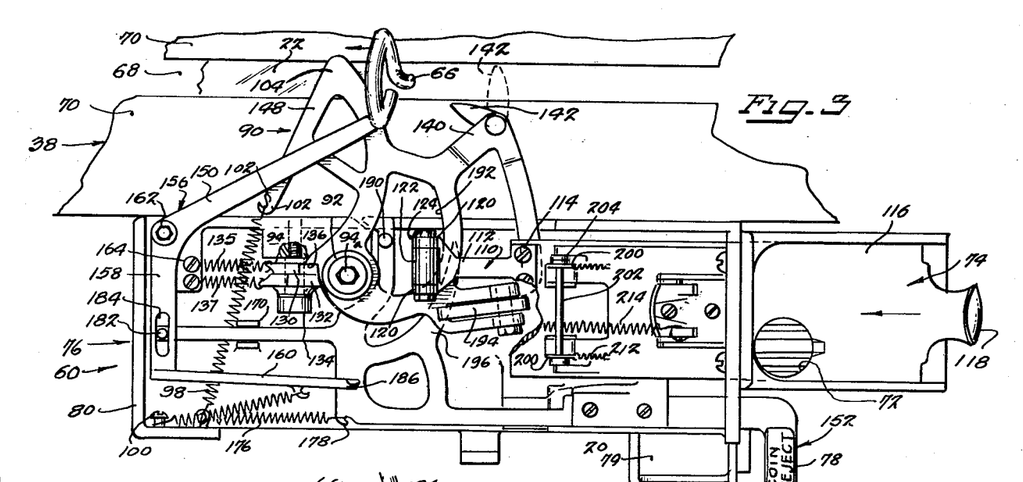
FIGURE 3 is a fragmentary, enlarged top view of a portion of the dispenser and the latch device in the position of FIGURE 1, with parts broken away and removed for clearer illustration.
Figure 4:
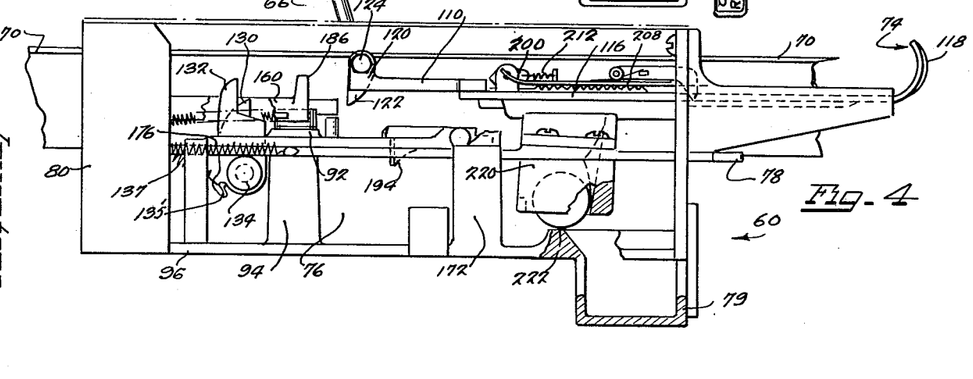
FIGURE 4 is a fragmentary side view of the dispenser and latch device in the position of FIGURE 3, with parts broken away and removed for clearer illustration.

With reference to FIGURES 3 and 4, the latch device 60 is illustrated in its latched, cocked, or first position as in FIGURES 1 and 2, wherein an empty basket 22 is retained in normal position within the cage 38. The latch housing 76 includes a body or frame 80 fixed, in any suitable manner, on an upper portion of the cage 38. In FIGURES 3–8 a cover 82 (FIGURE 1) is removed for purposes of clearer illustration. The cover 82 is operatively releasably secured to the frame 50 in any suitable manner as by a key operated lock 84 (FIGURE 1) thereby providing a closed container or depository for receiving the coins from the coin receiving hole 72.

Figures 5, 6, 9:
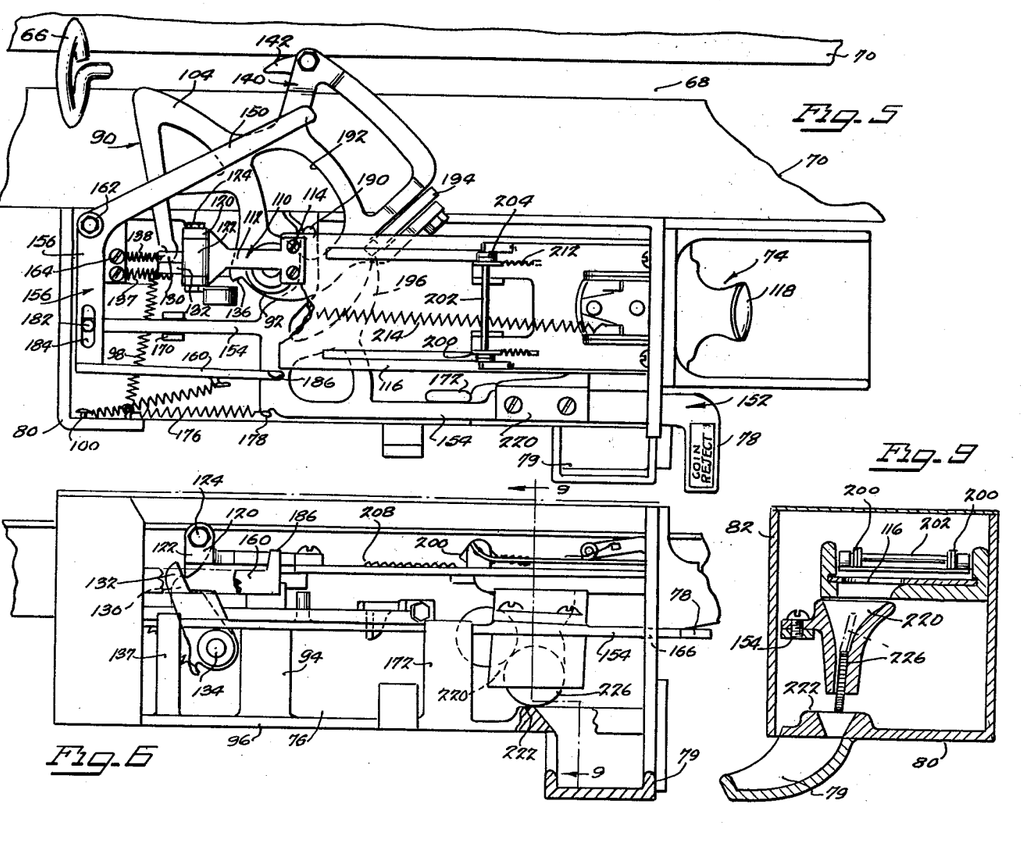
FIGURE 5 is a fragmentary top view, similar to FIGURE 3, but with the latch device in a released position.
FIGURE 6 is a fragmentary side view, similar to FIGURE 4, but with the latch device in the position of FIGURE 5.
FIGURE 9 is a fragmentary sectional view taken generally along the line 9—9 in FIGURE 6.

In the illustrated embodiment, the latch device includes a latch 90 having a hub 92 which is seated on a boss 94 formed integrally with and extending upwardly from a bottom wall 96 of the frame 80. A bolt 94 extends freely through a port in the boss and is threadedly received by a threaded vertical socket in the boss 94, thereby mounting the latch 90 for free pivotal movement between its cocked first position (FIGURES 3 and 4) and its released second position (FIGURES 5 and 6). As illustrated herein, the latch 90 is urged to its released position by resilient means, herein in the form of a spiral tension spring 98 secured at one end to the frame 80 as by a bolt 100 extending through an eye in the end of the spring and threadedly secured in the frame, and at an opposite end this spring has an eye received by a hook 102 formed integrally with the latch rearwardly of the pivot bolt 94. In cocked position of the latch mechanism 60, a retaining portion 104 of the latch 90 extends across the basket arm receiving slot 68 in the upper wall 70 of the cage 38 so that when the buyer releases the basket arm 66 the arm falls inwardly by gravity and against the retaining portion 104 of the latch.

Figure 7:
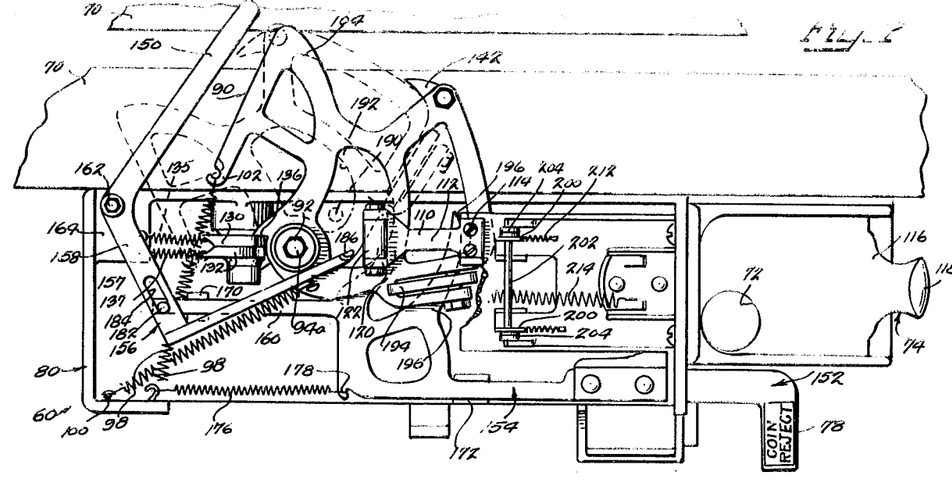
FIGURE 7 is a fragmentary top view, similar to FIGURE 3, but illustrating operation of a coin return mechanism.
Figure 8:
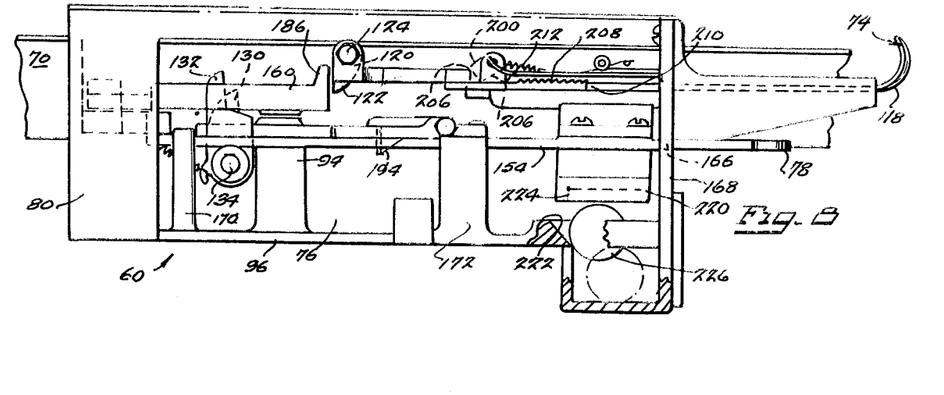
FIGURE 8 is a fragmentary side view, similar to FIGURE 4, but with the latch device in the position of FIGURE 7.

As previously described, a prospective buyer inserts a suitable coin in the coin receiving hole 72 and pushes the slide actuator 74 inwardly. An inner end of the slide actuator 74 includes a latch releasing unit 110 including a bracket 112 rigidly secured, as by bolts 114, to an inner end of an actuator slide plate 116 having an upturned grip 118 at its outer end. The bracket 112 has an integral, upwardly extending bifurcated inner end 120. A depending actuating pawl 122 is pivoted between upper portions of the bifurcation as by a horizontal pivot pin in the form of a bolt 124. A rear face of the pawl 122 is normally seated on a bight of the bifurcated portion to limit rearward swinging movement of the pawl, and as the slide actuator 74 is moved inwardly this pawl engages a pair of catches 130 and 132 pivoted for movement about a horizontal axis defined by a bolt 134 extending through holes in lower portions of these catches and threadedly secured in the boss 94. The catch 130 has one side face seated against the boss 94 to hold both catches against movement axially against the bolt 134. A spiral tension spring 135 is secured at one end, as by a bolt, to the frame 80 behind the catch 130 and at an opposite end to a hook 135' integral with the catch 130 rearwardly and below the pivot bolt 134, thereby urging the catch 130 clockwise (FIGURE 4) to seat the catch 130 against a shoulder 136 of the latch 90 immediately rearwardly of the latch hub 92, thereby releasably holding the latch in its cocked position. As the pawl 122 moves inwardly it engages the catch 130 to pivot the catch rearwardly so that the shoulder 136 is pivoted by the tension spring 98 into seated engagement with the catch 132 which is urged clockwise (FIGURE 4) by a spiral tension spring 137 mounted similarly to the mounting of the spring 135. Continued inward movement of the actuating slide 74 causes the pawl 122 to engage and release the catch 132 from engagement with the shoulder 136 so that the latch 90 is pivoted by the tension spring 98 to its released position as shown in FIGURES 6 and 7. The function of the catches 130 and 132 will be more fully described hereinafter with reference to the coin return mechanism. As previously mentioned, as the latch 90 moves from its cocked to its released position, the retaining portion 104 of the latch is pivoted counterclockwise (FIGURE 3) and out of the path of the arm 66 so that the arm may fall inwardly and rearwardly until its basket 22 again rests on the annular rod 14 within the tank 26.

After the empty basket 22 has dropped out of the cage 38 and back to its normal position in the tank 10, the cover 36 may be manually rotated to a position over a full basket 22 of the desired type of bait. Upon grasping the arm 66 of the selected basket and moving the arm upwardly through the cage slot 68, the arm engages a cocking portion 140 (FIGURE 5) of the latch 90. Continued movement of the arm 66 to move the full basket 22 to its dispensing position results in the arm sliding outwardly along the cocking portion 140 while pivoting the latch 90 clockwise from its released position (FIGURE 5) to its cocked position (FIGURE 3). During such movement the arm 66 engages a pivoted tab 142 pivoted on an outer end of the latch cocking portion 140 and swings the tab from the position shown in FIGURE 5 to the position shown by dotted line in FIGURE 3. As the basket 22 is moved to its dispensing position, as shown by dotted line at the right hand side of FIGURE 2, the latch 90 moves clockwise past the latched position of FIGURE 3 as the arm 66 moves past the outer end of the tab 142 whereupon the latch spring 98 pivots the latch 90 counterclockwise to seat the shoulder 36 against the catch 130, thus providing holding means for holding the latch in its cocked position. After the bait has been dispensed from the basket 22 and arm 66 has been released, the basket and arm pivot rearwardly and inwardly and the arm engages the tab 142 and pivots it counterclockwise from the dotted position to generally the solid position shown in FIGURE 3 whereupon the arm 66 comes to rest against the retaining portion 104 of the latch 90, as previously described.

Herein, coin return means is provided and is operable, when a suitable coin is placed in the coin receiving hole 72 and the actuator slide 116 is pushed inwardly to release the latch 90 so that the basket 22 and its arm 66 may drop back into the tank 10, for returning a coin and moving the latch back to its cocked position whereupon a stop portion 148 of the latch 90 is positioned across the cage slot 68 in the path of an arm 66 which might be moved through the slot, thus preventing a full basket from being emptied after the coin has been returned. The coin return means includes a stop member 150 which is positioned across the cage slot 68 and thus blocks the path of any arm 66 which might be moved toward its dispensing position as the latch 90 is being moved from its released position (dotted lines in FIGURE 7) to its latched position (solid lines in FIGURE 7).

More particularly, the coin return means includes a return unit 152 comprising a coin return slide operating part 154 and a generally U-shaped stop part 156 having a bight portion 158 connecting a leg defined by the stop member 150 and a second leg 160. The stop part 156 is pivoted to the frame 80 by means of a vertical bolt 162 extending through a hole at the juncture of the bight 158 and the stop member 150 and this bolt is threadedly received in a boss 164 of the frame 80. The coin return slide 154 extends through a slot 166 (FIGURE 8) in an upwardly extending front or outer wall 168 of the frame 80, and at an opposite end is seated in a cradle atop a pillar 170 extending upwardly from the bottom wall of the frame, and at an intermediate portion in a second cradle portion atop a pillar 172 also extending upwardly from the bottom wall of the frame 80, thus mounting the coin return slide 154 for sliding movement lengthwise of the frame 80. The grip 78 is provided on an outer end of the coin return slide 154 for moving the slide outwardly from a normal position as shown in FIGURE 3 to a coin return position as shown in FIGURE 7. A spiral tension spring 176 is connected at one end to a hook 178 integral with the coin return slide 154 between the cradle pillars 170 and 172, and at an opposite end this spring is secured to the rear of the frame 80 by means of the bolt 100. The inner end of the coin return slide 154 has an integral upwardly extending finger 182 received in an elongated slot 184 extending longitudinally of the stop part bight 158 so that as the coin return grip 78 is pulled outwardly to its coin return position the finger 182 pivots the stop part 156 about the vertical axis of the bolt 162 to move the stop member 150 into position extending across the cage slot 68 and into the path of any arm 66 moving through the slot 68. Simultaneously, an abutment 186 on the free end of the other leg 160 of the U-shaped stop part 156 pivots into the path of the latch releasing pawl 122 to block inward movement of the actuating slide 116 so that the catches 130 and 132 are not again engaged by the pawl 122 and the catches are in condition to again hold the latch 90 in cocked position. A second abutment finger 190, here on the coin return slide 154 is positioned to engage an inner surface 192 defining a cut out in the latch 90 for pivoting the latch from its released position as shown by dotted line in FIGURE 7, to its latched position as shown by solid line in FIGURE 7, upon moving the coin return grip 78 from its normal to its coin return position (FIGURE 7).

In order to prevent operation of the coin return means when the latch is in its latched position, the latch carries a holding pawl 194, urged by gravity to a lower normal holding position. When the holding pawl 194 is in its holding position and the latch 90 is in its latched position, as shown by solid lines in FIGURE 7, the holding pawl 194 is in position to engage a finger 196 which is integral with the return slide 154 and extends generally transversely of the body 80 so that the coin return slide 154 cannot be moved from its normal to its coin return position. As the latch 90 moves to its released position, the holding pawl 194 is swung out of the path of the finger 196 and the coin return slide 154 can be moved to coin return position thus returning the latch 90 to its latched position. Thereupon, when the coin return slide 154 is released it engages and raises the holding pawl 194 so that the coin return unit can return to its normal position.

Means for preventing outward movement of the actuating slide 116 after it has been moved inwardly sufficiently for its actuating pawl 122 to release the first catch 130 is provided by a pair of swinging retaining pawls 200 swingably mounted on opposite end portions of a horizontal shaft 202 suitably secured in upstanding ears 204 on the actuating slide 74 at either end of the shaft. Each pawl 200 has depending front and rear corners 206 (FIGURE 8) positioned to seat in series of teeth 208 on either side of the actuating slide 116 so that as the actuating slide is moved inwardly and the pawls 200 are swung clockwise (FIGURE 8) their front corners seat in the teeth 208 thus preventing the slide from being withdrawn. After the slide has been moved inwardly an amount sufficient to release the second catch 132, the front corners 206 pass over vertical edges 210 on the actuating slide 116 at the front ends of the respective series of teeth 208 so that as the slide now moves outwardly the pawls are rotated counterclockwise (FIGURE 8) and their rear corners ride over the teeth and prevent inward movement of the actuating slide 208. The releasing pawls 204 are urged to a normal, intermediate position by over center springs, as 212, one connected with each pawl 200 and with the actuating slide 116 outwardly of the releasing pawl. A suitable spring 214 is provided for urging the actuating slide 116 to its outer post position.

When a coin is deposited in a coin receiving hole 72 of the actuating slide 116, and the slide is then moved inwardly, the return unit is in normal position and the coin drops downwardly from the coin receiving hole 72 and into an upwardly opening V-shaped coin receiver 220 mounted on the coin return slide 154 and having an open lower end so that the coin rests on an abutment or retainer 222 which is integral with the frame 80 immediately below the return coin receiver. Upon moving the return unit to coin return position, the receiver moves the coin off the abutment whereupon this coin drops through an opening in the bottom wall of the frame and into the coin return chute 79.

To summarize the operation of the latch device, with an empty basket 22 hold in the cover cage 38 with its arm 66 resting against the retaining portion 104 of the latch 90, as shown in FIGURES 1–4, a coin is inserted in the coin receiving hole 72 of the actuating slide 116. The slide may then be pushed inwardly by means of its grip 118 to deposit the coin in the coin receiver 220 and to move the actuating pawl 122 into engagement with the first catch 130, thereby releasing this catch from engagement with the latch shoulder 136 and permitting this shoulder to swing into engagement with the second catch 132. The actuating slide 116 is held in this position by the releasing pawls 200 engaging the respective tracks 208 on the actuating slide 116, and in this position the coin return means cannot be operated because the second abutment finger 186 on the stop part 156 will engage the inner portion of the actuating slide. Upon further inward movement of the actuating slide 116 the second catch 132 and the pawls 200 are released and then the actuating slide may return to its normal outward position. Upon release of the second catch 132, the latch 90 moves to its released position so that the empty basket 22 drops back into the tank 10. The cover 36 may now be rotated so that the cage 38 is above a full basket 22 and the arm of this basket grasped, through the opening defined by the frame 64 in the cover, and lifted toward dispensing position through the slot 68 in the cage 38 thus engaging the cocking portion 140 of the latch 90 to swing the latch from its released position to its latched position as the basket is drawn into the dispensing position whereupon the bait flows outwardly through the spout 62 in the cover 36. Upon releasing the arm 66 of the emptied basket, the basket and arm fall rearwardly past the tab 142 of the cocking portion of the latch and rest against the retaining portion 104 of the latch as previously described. After the latch has been moved by the actuating slide 116 from its latched to its released position, so that the emptied basket drops out of the cage 38 and back into the tank 10, should the prospective buyer discover that all of the bait baskets are empty, or for any other reason desire return of his money rather than a basket of bait, he pulls the coin return grip 78 outwardly from its normal position (FIGURE 3) to its coin return position (FIGURE 7) whereupon the coin receiver 220 moves rearwardly to move the return coin 226 off of the abutment 222 and the return coin falls into the coin return chute 79. As previously discussed, the coin return means cannot be operated unless the latch 90 is in its released position because of engagement between the pawl 194 on the latch 90 and the finger 196 on the coin return slide 154. As the coin return grip 78 is moved to its coin return position, the stop member 150 is swung outwardly across the path of a basket arm 66 in the slot 68 so that another basket cannot be moved into dispensing position as the latch 90 moves from its released to its cocked position. After return of the coin and release of the coin return grip 78, the stop member 150 moves out of the path of an arm 66 through the slot 68, but the stop portion 148 of the latch 90 is positioned across the slot 68 to prevent any basket from being moved from within the tank to the dispensing position.

While this invention has been described with particular reference to certain structure, features, and operation in a particular environment, various changes may be apparent to one skilled in the art, and the invention is, therefore, not to be limited as such structure, features, operation or environment. Various features of the invention are set forth in the appended claims.

What is claimed is:

1. A coin operated latch device comprising, coin receiving means, a latch operable between a first position and a second position, means including an actuating member operable upon said coin receiving means receiving a coin for positioning said latch in said second position, means for releasably retaining said latch in said second position, and coin return means operable between a normal position and a coin return position and when in said normal position for releasably retaining a coin, and upon movement to said coin return position and operation of said actuating means to move said latch to said second position for releasing the last said coin and for releasing said latch from said second position for movement to said first position.

2. A coin operated latch device comprising, coin receiving means, a latch operable between a first position and a second position, means including an actuating member operable upon said coin receiving means receiving a coin for positioning of said latch in said second position, means for releasably retaining said latch in said second position, and coin return means operable between a normal position and a coin return position and when in said normal position for releasably retaining a coin, and upon movement to said coin return position when said latch is in said second position for releasing the last said coin and for releasing said latch for movement to said first position.

3. A coin operated latch device comprising, coin receiving means, a latch operable between a first position and a second position, means including an actuating member operable upon said coin receiving means receiving a coin for depositing the coin and positioning of said latch in said second position, means for releasably retaining said latch in said second position, and coin return means operable between a normal position and a coin return position and when in said normal position for releasably retaining a coin, and upon movement to said coin return position when said latch is in said second position for releasing the last said coin and for releasing said latch for movement to said first position.

4. A coin operated latch device comprising, coin receiving means, an actuating member operable upon said coin receiving means receiving a coin for depositing the coin in a depository, a latch operable between a first position and a second position upon operation of said actuating member, means for releasably retaining said latch in said second position, a coin return mechanism including, an operating part mounted for operation between a normal position and a coin return position when said actuating member is in said second position, means including a return coin receiver for receiving a coin from said coin receiving means and releasably retaining the last said coin when said operating part is in said normal position and for releasing the last said coin upon movement of said operating part to said return position, and means for releasing said latch from said second position and moving said latch to said first position as said operating part moves to said return position.

5. A coin operated latch device comprising, a coin depository, coin receiving means including a normally inoperative actuating member operable upon receiving a coin for depositing the coin in the coin depository, a latch operable between a first position for effectively holding a member and a second position for releasing the member, coin return means operable between a normal position and a coin return position and including a return coin receiver for receiving a return coin from said coin receiving means and releasably retaining said return coin when said coin return means is in said normal position, said receiver being mounted for movement to a coin releasing position upon movement of said coin return means to said return position, means for preventing operation of said coin return means when said latch is in said first position and for operation of said coin return means upon movement of said latch to said second position, a stop member mounted for movement between a normal position and a stop position for effectively stopping movement of said member, means for moving said stop member to said stop position upon movement of said receiver to said coin releasing position, means for moving said latch to said first position as said coin return means moves to said coin return position, and means for preventing movement of the latch to said second position when said coin return means is moved from its normal position.

6. A coin operated latch device comprising, a body including a coin depository, coin receiving means including an actuating member operable only upon receiving a coin for depositing the coin in the coin depository, a latch operable between a first position for effectively holding a member and a second position for releasing the member, coin return means including an operating part mounted for operation between a normal position and a coin return position, a return coin receiver for receiving a return coin from said coin receiving means and co-operating with a retainer on said body for releasably retaining said return coin and by-passing subsequent coins to said depository when said operating part is in said normal position, said receiver being mounted on said operating part for movement of said receiver to a coin releasing position with the return coin out of engagement with said retainer upon movement of said operating part to said return position, resilient means urging said operating part to said normal position, means for preventing operation of said coin return means when said latch is in said first position and including a pawl, means mounting said pawl for operation of said return coin means upon movement of said latch to said second position, a stop member mounted on said body for movement between a normal position and a stop position for effectively stopping movement of said member, resilient means urging said stop member to said normal position, means for moving said stop member to said stop position upon movement of said receiver to said coin releasing position and including a pin and slot connection between said operating part and said stop member, means for moving said latch to said first position as said operating part moves to said coin return position and including an abutment on said operating part for engaging said latch, and means on said stop member for preventing movement of the latch to said second position when said operating part is moved from its normal position.

7. A latch mechanism comprising, means including a latch operable between first and second positions, holding means normally releasably retaining said latch in said first position and operable for releasing said latch for movement to said second position, actuating means for releasing said holding means and including a normally inoperable actuator operable in a first direction for releasing said holding means, means for rendering said actuator operative, and means operable upon movement of said actuator in said first direction an amount sufficient to release said holding means for releasably holding said actuator against movement in a return direction opposite said first direction and releasing said actuator for movement in said return direction after said actuator has moved in said first direction an amount sufficient to release said holding means.

8. For use with a device having members movable along a path in either of opposite directions, a coin operated latch mechanism for controlling movement of said members along the path, said latch mechanism comprising, means including a latch operable between first and second positions for holding any one of said members against movement in one of said directions when said latch is in said first position and permitting such movement when said latch is in said second position, and for engagement by any of said members moving along the path in a direction opposite said one direction when said latch is in said second position, means mounting said latch for movement from said second position to said first position responsive to the last said member being moved along said path in said opposite direction, holding means normally releasably retaining said latch in said first position and operable for releasing said latch for movement to said second position, actuating means for releasing said holding means and including a normally inoperable actuator operable in a first direction for releasing said holding means, coin receiving means for rendering said actuator operative upon receiving a coin and for depositing the coin upon operation of said actuator to release said holding means, means operable upon movement of said actuator in said first direction an amount insufficient to release said holding means for releasably holding said actuator against movement in a return direction opposite said first direction and releasing said actuator for movement in said return direction after said actuator has moved in said first direction an amount sufficient to release said holding means, and means for preventing movement of any of said members opposite said one direction during operation of said coin return means.

9. For use with a device having members movable along a path in either of opposite directions, a coin operated latch mechanism for controlling movement of said members along the path, said latch mechanism comprising, means including a latch operable between first and second positions for holding any one of said members against movement in one of said directions when said latch is in said first position and permitting such movement when said latch is in said second position, and for engagement by any of said members moving along the path in a direction opposite said one direction when said latch is in said second position, means mounting said latch for movement from said second position to said first position responsive to the last said member being moved along said path in said opposite direction, holding means normally releasably retaining said latch in said first position and operable for releasing said latch for movement to said second position, actuating means for releasing said holding means and including a normally inoperable actuator operable in a first direction for releasing said holding means, coin receiving means for rendering said actuator operative upon receiving a coin and for depositing the coin upon operation of said actuator to release said holding means, means operable upon movement of said actuator in said first direction an amount insufficient to release said holding means for releasably holding said actuator against movement in a return direction opposite said first direction and releasing said actuator for movement in said return direction after said actutaor has moved in said first direction an amount sufficient to release said holding means, coin return means operable upon a coin being received by said coin receiving means and prior to a member being moved along the path in said one direction when said latch is in said second position for returning a coin and moving said latch to said first position, and means for preventing movement of any of said members opposite said one direction during operation of said coin return means.

10. A latch mechanism comprising, means including a latch operable between first and second positions, holding means including first and second catches normally releasably retaining said latch in said first position and upon release of said first catch said second catch releasably retaining said latch in position for movement to said second position, actuating means for releasing said holding means and including an actuator operable in a first direction for releasing said holding means, said first catch before said second catch, and means operable upon movement of said actuator in said first direction an amount sufficient to release said first catch but less than that required to release said second catch for releasably holding said actuator against movement in a return direction opposite said first direction and releasing said actuator for movement in said return direction after said actuator has moved in said first direction an amount sufficient to release said second catch.

11. For use with a device having members movable along a path in either of opposite directions, a coin operated latch mechanism for controlling movement of said members along the path, said latch mechanism comprising, means including a latch operable between first and second positions for holding any one of said members against movement in one of said directions when said latch is in said first position and permitting such movement when said latch is in said second position, and when said latch is in said second position for engagement by any of said members moving along the path in a direction opposite said one direction, means mounting said latch for movement from said second position to said first position responsive to the last said member being moved along said path in said opposite direction, holding means including first and second catches normally releasably retaining said latch in said first position and upon release of said first catch said second catch releasably retaining said latch in position for movement to said second position, actuating means for releasing said holding means and including a normally inoperable actuator operable in a first direction for releasing said holding means, said first catch before said second catch, coin receiving means for rendering said actuator operative upon receiving a coin and for depositing the coin upon operation of said actuator to release said first catch, means operable upon movement of said actuator in said first direction an amount sufficient to release said first catch but less than that required to release said second catch for releasably holding said actuator against movement in a return direction opposite said first direction and releasing said actuator for movement in said return direction after said actuator has moved in said first direction an amount sufficient to release said second catch, coin return means operable upon a coin being received by said coin receiving means and prior to a member being moved along the path opposite said one direction after said actuating means has released both catches for returning a coin and moving said latch to said first position, and means for preventing movement of any of said members opposite said one direction during operation of said coin return means.

12. For use with a dispensing device having containers each with an arm member movable along a path in either of opposite directions and normally urged in one of said directions, a coin operated latch device for controlling movement of said members along the path, said latch device comprising, a body, means including a latch operable between a cocked first position and a released second position and including, a retaining portion for extending into the path and holding a randomly selected member along the path and against movement in said one direction when said latch is in said cocked position and permitting such movement when said latch is in said released position, and a cocking portion for extending into said path in position for engagement with a member moving along the path in a direction opposite said one direction when said latch is in said released position and out of said path when said latch is in said cocked position, means pivotally mounting said latch on said body for movement from said released position to said cocked position responsive to any of said members being moved along said path in said opposite direction in engagement with said cocking portion, means urging said latch to said released position, holding means including first and second catches pivotally mounted on said body and normally releasably retaining said latch in said cocked position and upon release of said first catch said second catch releasably retaining said latch in position for movement to said released position, actuating means for releasing said holding means and including, manually operable means including a normally inoperable slide actuator slidably mounted on said body and operable in a first direction for releasing said holding means, said first catch before said second catch, coin receiving means for rendering said actuator operative upon receiving a coin and for depositing the coin in said body upon operation of said actuator to release said first catch, means operable upon movement of said actuator in said first direction an amount sufficient to release said first catch but less than that required to release said second catch for releasably holding said actuator against movement in a return direction opposite said first direction and releasing said actuator for movement in said return direction after said actuator has moved in said first direction an amount sufficient to release said second catch, and means normally urging said actuator in said return direction, coin return means operable upon a coin being received by said coin receiving means and prior to a member being moved along the path opposite said one direction after said actuating means has released both catches for returning a coin and moving said latch to said cocked position and including, a manually operable coin return part slidably mounted on said body and movable between a normal position and a coin return position, means including a detent on said latch for holding said return part against movement from said normal position to said coin return position when said latch is in said cocked position and said detent being movable with said latch to released position of said latch to permit movement of said return part from said normal position to said coin return position, and means mounting said detent for movement of said return part from said coin return position to said normal position when said latch is in said cocked position, and means for preventing movement of any of said members opposite said one direction upon movement of said return part to said coin return position and including a normally retracted stop member operatively connected with said return part and pivotally mounted on said body for movement into said path as said return part moves to said coin return position, and co-operating means on said stop member and said actuator to prevent movement of said actuator to release said first catch when said return part is moved toward said coin return position.

13. The latch device of claim 12 and means on said latch including a stop portion for preventing movement of a member along said path in said opposite direction when said latch is in said latched position.

14. For use with a device having arm members each individually movable along a path in either of opposite directions and normally urged in one of said directions, a coin operated latch mechanism for controlling movement of said members along the path, said latch mechanism comprising, means including a latch operable between first and second positions and including, a retaining portion for extending into the path and holding a randomly selected one of said members along the path and against movement in said one direction when said latch is in said first position and permitting such movement when said latch is in said second position, and another portion for extending into said path in position for engagement with one of said members moving along the path in said opposite direction when said latch is in said second position and free of the last said member when said latch is in said first position, means mounting said latch for movement from said second position to said first position responsive to one of said members being moved along said path in said opposite direction in engagement with said other portion, means urging said latch to said second position, holding means including first and second catches normally releasably retaining said latch in said first position and upon release of said first catch said second catch releasably retaining said latch in position for movement to said second position, actuating means on said body for releasing said holding means and including, manually operable means including a normally inoperable slide actuator operable in a first direction for releasing said holding means, said first catch before said second catch, coin receiving means for rendering said actuator operative to release said first catch upon receiving a coin, means operable upon movement of said actuator in said first direction an amount sufficient to release said first catch but less than that required to release said second catch for releasably holding said actuator against movement in a return direction opposite said first direction and releasing said actuator for movement in said return direction after said actuator has moved in said first direction an amount sufficient to release said second catch, and means normally urging said actuator in said return direction, coin return means operable upon a coin being received by said coin receiving means and prior to a member being moved along the path opposite said one direction after said actuating means has released both catches for returning a coin and moving said latch to said first position and including, a manually operable return part movable between a normal position and a coin return position, means including a detent for holding said return part against movement from said normal position to said coin return position when said latch is in said first position and said detent being movable with said latch to said second position of said latch to permit movement of said return part from said normal position to said coin return position, and means mounting said detent for movement of said return part from said coin return position to said normal position when said latch is in said first position, and means for preventing movement of any of said members opposite said one direction upon movement of said return part to said coin return position and including a normally retracted stop member on said return part and mounted for movement into said path as said return part moves to said coin return position.

References Cited by the Examiner
UNITED STATES PATENTS
2,863,587   12/58   Schinzel.

SAMUEL F. COLEMAN, *Primary Examiner.*
ERNEST A. FALLER, JR., *Examiner.*